April 18, 1933.　　　R. W. STROUT　　　1,904,563
POSITIVE ACTION CLUTCH
Filed Nov. 4, 1930
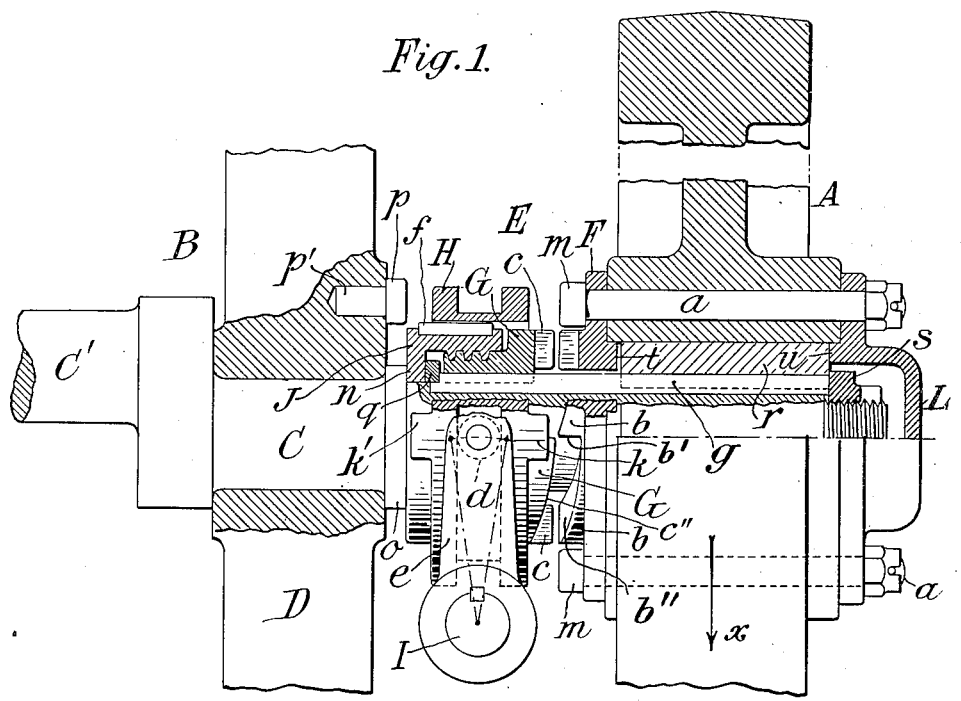
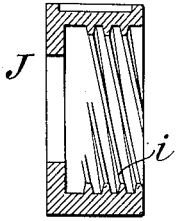
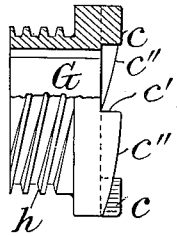
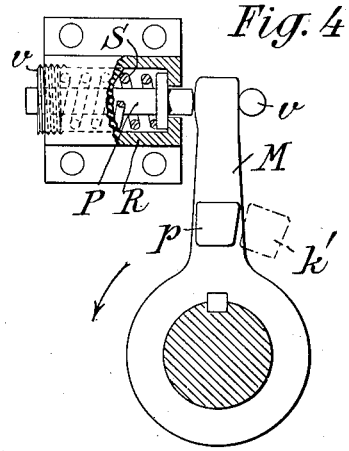
INVENTOR:
Robert W. Strout,
By Attorneys,
Fraser, Myers + Manley Patented Apr. 18, 1933

1,904,563

UNITED STATES PATENT OFFICE

ROBERT W. STROUT, OF BROOKLYN, NEW YORK, ASSIGNOR TO E. W. BLISS COMPANY, OF BROOKLYN, NEW YORK, A CORPORATION OF DELAWARE

POSITIVE-ACTION CLUTCH

Application filed November 4, 1930. Serial No. 493,253.

This invention relates to clutches for connecting a driving member positively to a driven member at a definite point or points in the rotation, as distinguished from clutches of the friction type. Such positive clutches necessarily lock the stationary driven part to the rotating driving part with an abrupt shock upon the coming into contact of the driving and driven clutch faces, there being little or no opportunity for cushioning such shock. It is, accordingly, important that the abutting driving and driven faces should be wholly engaged at the moment of impact in order to afford the maximum area for receiving the blow. In such clutches, as ordinarily constructed, there is liability that the abutting faces or shoulders may not be fully engaged, with the result that their edges or corners are apt to be worn or pounded down or "dubbed off", with the consequence that such faces are eventually broken down into an irregular curved form having an angle to the original faces which were perpendicular to the direction of thrust. When this occurs, the clutch is liable to release prematurely when under load.

The present invention aims to ensure the complete coming together of the respective abutting faces whenever the clutch is engaged, so that their maximum area shall be availed of to withstand the blow or shock incident to starting.

To this end one of the clutch members is provided with means for advancing it into engagement with the other synchronously with the rotation, so that when the operator initiates the movement required to engage the clutch, a complete movement shall be synchronously performed before the abutting of the respective faces. This is accomplished by first engaging a light part or operating member which acts through a wedging incline to advance one of the clutch members at a rate synchronized with the advance of the mating members, so that upon the completion of a prescribed portion of the revolution the respective clutch members shall be brought into complete coincidence immediately preceding the shock of impact.

Clutches of this type are commonly used for driving, from a freely rotating pulley or flywheel, a shaft or other rotating member through which power is communicated to the active members of the machine. As an example, the invention will be illustrated as applied to a power press where the flywheel revolves around a prolongation of the crank shaft (or a shaft geared to the crank shaft), so that the wheel revolves freely until the clutch is engaged and thereupon carries the shaft with it until it is disengaged.

Figure 1 of the accompanying drawing illustrates a fragment of such a press, the view being an elevation partly in vertical section in the plane of the axis of the shaft;

Figs. 2 and 3 are views, respectively, of the operating collar and the driven clutch member, both being in diagrammatic section and the latter partly in elevation; and Fig. 4 is a fragmentary transverse section showing a further construction wherein the arresting stop is yieldingly mounted.

Referring particularly to Fig. 1, A is the flywheel or driving part, which may be a pulley, gear, or other member by which power is applied to the machine; B is generally the machine to be driven, in this instance being a power press; C is the shaft to which the power is applied, which in the present instance is a crank shaft, having bearings in a frame D and having a crank C' for communicating motion to some moving part of the press or other machine. E is generally the clutch for coupling the wheel A to the shaft C. This clutch includes a driving member F and a driven member G, the driving member being shown as fastened to the driving part A by bolts $a$, as an example of a suitable mechanical connection; and the driven member being connected to the shaft C in a manner to be described later. The driving member F has one or more driving teeth $b$, and the driven member has an equal number of corresponding driven teeth $c$. Essentially each member might have only one tooth, but for balancing the stresses it is important to have at least two teeth, and in the construction shown the teeth are four in number. This enables the clutch to be engaged at intervals of ninety degrees and, consequently, allows slightly less than one-quarter of a revolution for the engaging operation. The teeth are shown as having abrupt engaging faces $b'$ and $c'$, respectively, and a wedge-shaped or helical surface $b''$, $c''$, respectively. Ideally the inclination of these latter surfaces corresponds to a helix or screwthread having a lead equal to four times the projection of the teeth.

For engaging the clutch the usual grooved sliding ring H is provided, operated by rollers $d$ on fork arms $e$ carried on a rock-shaft I in the well-understood manner. Within the ring H is an internally-threaded collar or ring J which is so mounted that it cannot move endwise or axially along the shaft and is confined rotatively to the ring H by a spline $f$. The driven member G is rotatively confined to the shaft C by means of a spline $g$ and is formed with external screw-threads $h$ which are engaged by the internal threads $i$ of the collar J. These screw-threads $h$, $i$ have a lead corresponding to that of the clutch teeth $b$, $c$. The sliding ring H (unlike those commonly used) is formed with opposite lugs $k$ and $k'$. When moved to the right in Fig. 1 to engage the clutch, the lug $k$ is carried into the path of a revolving lug $m$ carried by the driving part A. The lugs $m$ are equal in number to the clutch teeth $b$, $c$. The lugs $m$ may be applied in any suitable way to the driving member, being shown as formed conveniently as the heads of the bolts $a$. The opposite lug $k'$ on the ring H is brought by the opposite or disengaging movement of the ring into the plane of a fixed stop $p$ conveniently mounted on the frame D of the machine. Thus when the ring H (which may be aptly designated the "clutch pilot") is moved to one side, it is caused to revolve with the driving member, and when moved to the opposite side, it is stopped by the engagement of the lugs $k'$, $p$. In the former case it acts through the collar J to screw the clutch member G forward into engagement with the clutch member F; in the latter case it has the contrary action, screwing the clutch member G backward out of engagement and stopping the driven member.

For clearness of illustration, the parts are shown in Fig. 1 with the pilot ring H in mid position, it being understood that in the stationary position this ring is to the left and during the driving rotation it is displaced to the right, these positions of the fork arms $e$ and roller $d$ being indicated in dotted lines. Starting with the stationary position of the shaft, with the driving wheel A revolving in the direction of the arrow $x$; let it be assumed that the operator throws the pilot ring H to the right and thereby brings its lug $k$ into the path of one of the fixed lugs $m$; upon $m$ striking $k$, the ring H is locked to the driving wheel and through the spline $f$ carries with it the screw ring J. As these parts are of light weight, their inertia is overcome without perceptible shock. The clutch member G being stationary, by reason of its splined connection with the shaft C, its screw-threads $h$ are acted upon by the revolving screw-threads $i$ to advance the clutch member G toward the clutch member F at such rate that the teeth $c$ will enter into the path of the teeth $b$ so that they interfit with slight clearance, and at the end of this movement of the clutch member G its teeth have entered fully into engagement with the teeth $b$. That is to say,—with four teeth, as shown, a turn of ninety degrees brings the clutch member G from the position shown in Fig. 1, where the respective teeth barely pass, to the position in which they are fully engaged, so that the entire area of each of the abutting teeth $b$, $c$ is brought into abutment. This, with the construction shown, causes their helical faces $c''$, $b''$ to move in spiral parallelism until the instant of their abutment. Upon such abutment the clutch member F carries with it positively the clutch member G, which through the spline $g$ rotates the shaft C. This condition continues until the clutch is released by throwing the pilot ring H to the left, so that its lug $k$ passes out of the path of the lug $m$ and its lug $k'$ enters into the plane of the stop lug $p$; thereupon, when the revolving lug $k'$ strikes the stationary lug $p$, the ring H is stopped and with it the screw ring J; the clutch member G being still driven by its engagement with the tooth $b$, its screw-threads $h$ act against the screw-threads $i$ to screw the member G backward, or toward the left in Fig. 1, until the teeth $c$ are backed out of engagement with the driving teeth $b$. The clutch member G then continues its backward movement until it takes up the end play provided between itself and the ring J, whereupon the parts G, J, H become locked together and the shaft C is stopped.

Some details remain to be described. The screw ring or collar J is kept from longitudinal movement by having an inturned flange $n$, which enters between a flange $o$ on the shaft, and a thrust washer $q$, which also is confined against a shoulder on the shaft. This thrust washer serves also to receive the abutment of the clutch member G when fully screwed back. The flywheel A is shown as turning on a bearing sleeve $r$ surrounding the shaft C and keyed thereto by the spline $g$. This bearing sleeve is held in place by a nut $s$ screwed on the threaded end portion of the shaft. This portion is enclosed within a cap L which is fastened to the hub of the wheel A by the bolts $a$. The end thrust of the wheel A is taken on one side by an annular portion $t$ of the clutch member F and on the other side by an annular portion $u$ of the cap L, which portions come against opposite ends of the bearing sleeve $r$.

The stop lug $p$ may be mounted in any suitable way upon the driven machine, being shown as formed with a pin $p'$ driven into a bore in the frame D. This is suitable for comparatively small machines; but for large and heavy machines, where the impact of stopping is serious, it is desirable to cushion the stop lug $p$,—which may be variously accomplished, as, for example, by mounting it as shown in Fig. 4 on a lever M normally pressed against a stop $v$ by a spring-pressed plunger P which yields, when the stop lug $k'$ strikes the stop $p$, in the direction shown by the arrow and thereby cushions the blow. The plunger P may be pressed by a spring S enclosed in a casing R and adjusted by a screw-plug $v$.

In the construction shown, the thrust washer $q$ is held against the ends of the spline keys $g$, of which in practice there should be three or more, and these keys desirably abut at their outer ends against the nut $s$.

With the clutch construction provided by this invention, it is impossible for the operator to so engage the clutch that the end portions only of the clutch teeth come into abutment. The clutch is engaged by a synchronized movement, the axially movable member being displaced in proportion to the speed of rotation, and is equally effective at all speeds. Thus the clutch engaging member is synchronized with the driving member of the clutch and ensures the entry of the driven member into engagement with the driving member at such rate as to ensure that the respective clutch teeth shall become fully engaged to their complete depth. With a clutch having four teeth, this movement is accomplished in ninety degrees of rotation plus any movement considered desirable for clearance. In a three-teeth clutch this engagement would occur in one hundred and twenty degrees, or with a two-teeth clutch in one hundred and eighty degrees.

A clutch of the type described as heretofore constructed has been in effect a one-way clutch, since a reversal of the driving wheel A forces back the clutch member G; the same unclutching occurs when resilient dies are used, which drive the crank-shaft ahead of the driving wheel. But with the present construction it is possible to so proportion the parts that this unclutching will not occur, which in certain cases is advantageous. The turning back of clutch member F acts, through the helical faces of the clutch teeth, to force back the clutch member G, which tendency is resisted by the threads $h$, $i$, which have an effective resistance depending upon the angle of the helix. With the proportions shown this angle is not sufficiently great to cause the threads $h$ to run into the threads $i$ of the collar J under the end pressure of the helical clutch teeth. It results that the clutch does not automatically disengage, but can be thrown out only under control of the collar H operated from the shaft I.

The construction shown is the most compact and advantageous for comparatively small and light machines, and may be modified to adapt the clutch to other conditions. Generally speaking, the clutch structure may be subjected to any modification required to adapt it to the particular machine to be driven. The invention, accordingly, is susceptible of modification within the scope of the appended claims.

It will be understood that the stop $p$ is essentially a holding member for the pilot ring H and that any other means of holding this ring stationary when it is desired to unclutch will serve its purpose.

The screw ring or collar J is essentially an operating member for moving the clutch members into or out of engagement according as it is itself coupled to the driving member or to the holding means. Its function is to advance one clutch member into engagement with the other and afterward to retract such member for unclutching. It operates preferably on the driven member. The function of the pilot member is to serve as the means for coupling the operating member to the driving member for clutching or to the holding means for unclutching.

What I claim is:

1. A clutch comprising driving and driven members having reciprocally engaging teeth, one of them being movable to engage or disengage said teeth, an operating member having a spiral engagement with the movable clutch member, means for driving the operating member from the driving member for engaging the clutch members, and means for stopping the operating member to disengage the clutch members, the parts being in synchronized relation to bring the clutch teeth into full locking engagement.

2. A clutch comprising driving and driven members having reciprocally engaging teeth, one of said members being movable, an operating member having a spiral engagement with the movable member on a pitch corresponding with that of the clutch teeth, means for driving the operating member from the driving member for engaging the clutch members comprising a rotating shoulder turning with the driving member and a projection engageable thereby having non-rotative relation with the operating member, and means for stopping the operating member to disengage the clutch members, the parts being in synchronized relation to bring the clutch teeth into full locking engagement.

3. A clutch comprising driving and driven members having reciprocally engaging teeth, one of said members being movable, an operating member having a spiral engagement with the movable member on a pitch corresponding with that of the clutch teeth, means for driving the operating member from the driving member for engaging the clutch members, and means for stopping the operating member to disengage the clutch members comprising a relatively stationary part and a projection engageable therewith having non-rotative relation with the operating member, the parts being in synchronized relation to bring the clutch teeth into full locking engagement.

4. A clutch comprising driving and driven members having reciprocally engaging teeth, an operating member having a spiral engagement with one of the clutch members, and a pilot member movable into driving engagement with the driving member or into engagement with a holding member and engaging the operating member, whereby to advance or retract the movable clutch member, the parts being in synchronized relation to bring the clutch teeth into full locking engagement.

5. A clutch comprising driving and driven members having reciprocally engaging teeth and an operating member having a spiral engagement with one of the clutch members, a pilot member movable into driving engagement with the driving member, and a holding member with which the pilot member engages when oppositely moved, the pilot member engaging the operating member whereby to advance or retract the movable clutch member, and the engaging parts relatively located in symmetrical relation with the clutch teeth, whereby the engaging movement brings the teeth into full engagement.

6. A clutch comprising driving and driven members, an operating member, a pilot member, and a holding member, the clutch members having reciprocally engaging teeth, the pilot member and driving member having reciprocally engaging lugs, and the pilot member and holding member adapted for reciprocal engagement, the pilot member connected nonrotatively to the operating member, the latter having a spiral engagement with one of the clutch members on a pitch corresponding with that of the clutch teeth, and the driven member having non-rotative engagement with the machine part to be driven.

7. A clutch comprising driving and driven members having reciprocally engaging teeth and an operating member having a spiral engagement with the driven member on a pitch corresponding with that of the clutch teeth adapted when held from rotation to retract the driven member to bring the clutch teeth out of engagement, and the driven member movable into fixed abutment with the operating member to lock them together for stopping the driven part.

In witness whereof, I have hereunto signed my name.

ROBERT W. STROUT.